United States Patent Office 3,767,723
Patented Oct. 23, 1973

3,767,723
POLYAROMATIC PRODUCTION
Raymond L. Cobb, Bartlesville, Okla., assignor to
Phillips Petroleum Company
No Drawing. Filed Nov. 22, 1971, Ser. No. 201,193
Int. Cl. C07c 5/14
U.S. Cl. 260—670                                    8 Claims

ABSTRACT OF THE DISCLOSURE

Polyaromatics are produced in good yield and high selectivity by reacting an aromatic hydrocarbon with an aromatic aldehyde in the presence of a Group Ia, IIa or IIb catalyst at an elevated temperature. In one embodiment, biphenyl is produced by the reaction of benzene with benzaldehyde utilizing a basic catalyst. The products are useful as stable heat exchange materials, e.g., as moderators in nuclear reactors.

---

This invention relates to the conversion of hydrocarbons. In accordance with another aspect, this invention relates to the production of polyaromatics from aromatic hydrocarbons and aromatic aldehydes. In accordance with a further aspect, this invention relates to the production of polyaromatics by the reaction of an aromatic aldehyde with an aromatic hydrocarbon in the presence of a Group Ia, IIa or IIb catalyst at an elevated temperature. In accordance with a further aspect, this invention relates to the production of biphenyl by the reaction of benzaldehyde with benzene.

Polyarmoatics have been conventionally manufactured by non-catalytic processes. However, these processes ordinarily yield unwanted by-products. Various expedients have been employed to inhibit the formation of by-products in the conversion of aromatics to polyarmoatics and to increase the yield of polyaromatics. In accordance with the invention, it has been found that good yield and selectivity to polyaromatics can be obtained utilizing a catalytic process for the conversion of aromatic hydrocarbons to polyaromatics.

An object of this invention is to provide an improved process for the production of polyaromatics.

Another object of this invention is to increase the yield and selectivity of polyaromatic production in a catalytic process.

Another object of this invention is to provide an improved polyaromatic process whereby the yield of converted reactant hydrocarbon is improved because of increased catalyst activity and selectivity.

Other objects and aspects as well as the several advantages of the invention will be apparent to those skilled in the art upon reading the specification and the appended claims.

In accordance with the invention, aromatic hydrocarbons and aromatic aldehydes are converted to polyaromatics by contacting same with a basic inorganic compound catalyst at an elevated temperature.

More specifically in accordance with the invention, polyaromatic compounds such as biphenyl, terphenyl, polynaphthyl, and the like are prepared by reaction of aromatic aldehydes, such as benzaldehyde or naphthaldehyde, with benzene or naphthalene over a Group Ia, IIa or IIb metal catalyst at an elevated temperature.

Further in accordance with the invention, alkylated reactants, such as toluene, give the corresponding substituted polyaromatics in the presence of an aromatic aldehyde and one of the defined catalysts.

In accordance with a specific embodiment, biphenyl is produced by the reaction of benzene with benzaldehyde in the presence of one of the defined catalysts by carrying out the reaction at a temperature in the range 350–500° C.

The basic catalyst of the present invention comprises supported or unsupported Group Ia, IIa or IIb metals. Suitable catalysts that can be employed include the oxides, hydroxides and salts of Groups Ia, IIa and IIb metals. The catalyst can be a single component, such as magnesium silicate, or an impregnated support, such as potassium hydroxide deposited on magnesium silicate. Suitable metallic salt catalysts include the silicates, phosphates, borates, aluminates, and mixtures thereof, containing at least one Group Ia, IIa or IIb metal. Any suitable catalytic support can be used, for example, alumina, silica, molecular sieves, magnesium oxide, kieselguhr, charcoal, asbestos, calcium carbonate, calcium oxide, and the like, and mixtures thereof. In the event that a support material is used, the amount of Group Ia, IIa or IIb metal compound employed for the impregnation will ordinarily be in the range of 0.1 to 20 weight percent of the support.

Any convenient and conventional catalyst preparation method can be used. For example, aqueous impregnation of a suitable catalytic support with suitable Group Ia, IIa or IIb compounds can be employed. Suitable metal compounds that can be employed for impregnation of the supports include the alkali metal and alkaline earth metal hydroxides and oxides such as sodium hydroxide, potassium hydroxide, lithium hydroxide, magnesium oxide, calcium hydroxide, barium hydroxide, calcium oxide, magnesium hydroxide, magnesium silicate, calcium phosphate, sodium borate, potassium aluminate, barium phosphate, and mixtures thereof.

The various catalysts employed in this invention can be prepared by conventional procedures and in many instances will be available commercially. For example, potassium hydroxide can be deposited on the support from an aqueous solution, followed by drying and calcining of the impregnated support. Another suitable method is by dry mixing the desired support and promoting components, followed by pelletizing and calcining. If desired, a catalyst support such as silica, or silica-alumina, can be prepared in gel form, this gel impregnated with the desired promoters, the impregnated support formed into a suitable shape, and the resulting product heated or calcined to activate. Suitable catalysts can also be prepared by coprecipitation of the support and promoting agents, followed by drying, forming, and heating. The heating or calcining is normally carried out at 800 to 1200° F., although temperatures outside this range can also be used. The catalyst should be protected from any liquids or gaseous materials which would tend to deactivate it during preparation, activation, or storage.

The aromatic hydrocarbons that can be employed as one of the reactants of the invention include monocyclic as well as condensed ring aromatic hydrocarbons. The aromatic hydrocarbon can be substitued with alkyl groups having from one to four carbon atoms per substituent, with a maximum of ten carbon atoms total in the alkyl substituents. The maximum number of alkyl groups in the aromatic hydrocarbon is three.

Representative examples of suitable aromatic hydrocarbons that can be employed include benzene, toluene, naphthalene, 3,5-(n-butyl)ethylbenzene, 4-methylnaphthalene, p-xylene, meta-xylene, n-butylbenzene, 2-p-tolylpropane, isobutylbenzene, anthracene, isopropylbenzene, and the like.

The aromatic aldehydes that can be employed according to the invention include monocyclic and condensed ring aromatic aldehydes. Alkylated aromatic aldehydes can also be employed wherein the alkyl groups contain from one to four carbon atoms with a maximum of ten carbon atoms in the alkyl substituents.

Representative examples of suitable aromatic aldehydes that can be employed include benzaldehyde, 1-naphthaldehyde, p-tolualdehyde, 3,5-dimethylbenzaldehyde, 2,4-dimethylbenzaldehyde, 3,5-(n-butyl)-2-ethylbenzaldehyde, 4-methyl-2-naphthaldehyde, m-tolualdehyde, 9-anthraldehyde, 2-naphthaldehyde, and the like.

The conditions employed during the reaction for the production of polyaromatics according to the invention will vary appreciably depending upon the hydrocarbon feedstock and other conditions. Generally, the temperature employed will be in the range 350–600° C., preferably 400–500° C. The pressure will ordinarily range from 15 to 10,000 p.s.i.g., preferably 500–1500 p.s.i.g. The feed rate for reactant materials in the present invention will ordinarily be in the range 0.01–10 WHSV, preferably 0.1–5 WHSV.

The weight percent of aromatic aldehyde in the feed charged to the reaction zone will ordinarily be in the range 5–50 weight percent, preferably 10–30 weight percent range, based on total feed comprising aromatic hydrocarbon and aromatic aldehyde.

The temperature to be employed in the reaction zone will be determined largely by other operating conditions, that is, at a particular pressure, weight hourly space velocity, and amount of aromatic aldehyde in the feed.

In utilizing the catalyst of the invention for the production of polyphenyls, the reaction can be carried out either batchwise or continuous, preferably the latter.

The following specific examples are entended to illustrate the advantages of the above-described catalyst of this invention for the production of polyphenyls.

SPECIFIC EXAMPLE

A series of runs was carried out for the reaction of benzene with benzaldehyde over various catalysts of the invention to produce biphenyl. In each run the feed was 15 weight percent benzaldehyde in benzene and the reaction conditions were 430° C., 1000 p.s.i.g., and WHSV of 0.1–0.2.

TABLE I

| Example | Benzaldehyde, percent conversion | Biphenyl, percent selectivity | Catalyst |
|---|---|---|---|
| I | 75–80 | 25 | R–2. |
| II | 85–90 | 30–35 | Magnesium silicate (R–161). |
| III | 100 | 8.1 | Zinc oxide (R–3154). |
| IV | 9.3 | 31.0 | KOH on 4A molecular sieve. |

NOTE.—R–2 contains 3% potassium hydroxide, 5% barium hydroxide, 3% magnesium oxide, and 89% alumina, and is commercially available. R–161 is a synthetic magnesium silicate (trade name "Florisil"). R–3154 contains 78% zinc oxide, 10% silica, 6% aluminum oxide, 0.3% calcium oxide, and 5% water.

The Example IV catalyst was prepared by slurrying 4A molecular sieves in aqueous potassium hydroxide to effect impregnation. After stripping off the water, the base treated 4A molecular sieves were dried and ready for use.

The stainless steel reactor tube was filled with catalyst, purged with nitrogen, brought to reaction temperature, and the reactants were pumped through at a rate such that the WHSV was in the range of 0.1–0.2.

As can be seen from the above examples using different catalysts according to the invention, a high conversion of the aromatic aldehyde and a good selectivity to the corresponding polyaromatic are realized.

Although the above examples utilize unsubstituted aromatics and aromatic aldehydes as reactants, it is within the scope of the invention to use alkylated reactants such as toluene to give the corresponding substituted polyaromatics in the presence of the above-defined catalysts.

I claim:
1. A process for the production of polyaromatics which comprises reacting an aromatic aldehyde and an aromatic hydrocarbon in the presence of a catalyst comprising a basic inorganic compound.

2. A process according to claim 1 wherein the amount of aromatic aldehyde present during said reacting is in the range 5–50 weight percent based upon total feed comprising aromatic hydrocarbon and aromatic aldehyde.

3. A process according to claim 1 wherein the aromatic aldehyde is benzaldehyde and the aromatic hydrocarbon is benzene.

4. A process according to claim 1 for the production of biphenyl which comprises reacting benzaldehyde with benzene at a temperature in the range 350–600° C., in the presence of a catalyst comprising potassium hydroxide, barium hydroxide, and magnesium oxide supported on alumina.

5. A process according to claim 1 for the production of biphenyl which comprises reacting benzaldehyde with benzene at a temperature in the range 350–600° C. in the presence of a catalyst comprising magnesium silicate.

6. A process according to claim 1 for the production of biphenyl which comprises reacting benzaldehyde with benzene at a temperature in the range 350–600° C. in the presence of a catalyst comprising zinc oxide.

7. A process according to claim 1 for the production of biphenyl which comprises reacting benzaldehyde with benzene at a temperature in the range 350–600° C. in the presence of a catalyst comprising potassium hydroxide supported on a molecular sieve.

8. A process according to claim 1 wherein the basic inorganic compound catalyst is an oxide, hydroxide or salt of a Group Ia, IIa or IIb metal.

References Cited
UNITED STATES PATENTS

| 2,143,509 | 1 1939 | Conover et al. | 260—670 |
| 2,854,493 | 9/1958 | Fetterly et al. | 260—670 |
| 3,080,434 | 3/1963 | Odioso et al. | 260—670 |
| 3,359,340 | 12/1967 | Hand | 260—670 |
| 3,435,084 | 3/1969 | Cabbage et al. | 260—670 |

CURTIS R. DAVIS, Primary Examiner

U.S. Cl. X.R.

260—668 R